United States Patent [19]
Brown et al.

[11] Patent Number: 5,243,759
[45] Date of Patent: Sep. 14, 1993

[54] METHOD OF CASTING TO CONTROL THE COOLING AIR FLOW RATE OF THE AIRFOIL TRAILING EDGE

[75] Inventors: Wesley D. Brown; Kenneth B. Hall, both of Jupiter; Robert J. Kildea, North Palm Beach, all of Fla.

[73] Assignee: United Technologies Corporation, Hartford, Conn.

[21] Appl. No.: 772,296

[22] Filed: Oct. 7, 1991

[51] Int. Cl.$^5$ .......................... B22C 9/10; B23P 15/02
[52] U.S. Cl. ................................ 29/889.721; 29/407; 29/889.7; 164/4.1; 164/122.1
[58] Field of Search ................ 164/4.1, 76.1, 122.1, 164/122.2, 369; 29/889.7, 889.721, 407

[56] References Cited

U.S. PATENT DOCUMENTS 4,358,882  11/1982  Wilkinson ..................... 164/4.1 X
4,627,480  12/1986  Lee ................................ 164/369

FOREIGN PATENT DOCUMENTS 2105624A  3/1983  United Kingdom ............ 164/369

*Primary Examiner*—J. Reed Batten, Jr.
*Attorney, Agent, or Firm*—Norman Friedland

[57] ABSTRACT

The flow rate of the cooling air at the trailing edge of the airfoil of a turbine blade for a gas turbine engine is established by casting the blade to include judiciously located radially spaced projections adjacent to or in the ribs in the trailing edge which serve to meter the flow in the channels formed between the ribs. The holes for forming the projections in the core that are used to form the internal cooling passages in the trailing edge are intentionally undersized. After the core is cleaned and flashed, the blade is cast in a mold and the ceramic core is leached out. The internal cooling passages in the trailing edge are flow tested to obtain the flow rate and pressure and this data is used to resize the projection. Resizing the projection is made by reforming the core with the same die, and with the information previously obtained in the flow test, the holes that form the projections are enlarged by drilling to obtain the desired flow rate. This process is repeated until the desired flow rate for each trailing edge channel is achieved. The die may be changed at this juncture to provide the ultimate dimensioned hole in the core to provide the necessary metering of the cooling air to attain the predetermined flow rate.

7 Claims, 6 Drawing Sheets

METHOD OF CASTING TO CONTROL THE COOLING AIR FLOW RATE OF THE AIRFOIL TRAILING EDGE

TECHNICAL FIELD

This invention relates to cooled turbine blades for a gas turbine engine and particularly to means of tailoring the cooling air flow rate discharging through the trailing edge slots of the blade's airfoil and the method thereof.

BACKGROUND ART

As is well known, the core used to form the internal passages, ribs, and heat transfer enhancement means for investment cast air cooled turbine blades or stator vanes is fabricated from a ceramic material. This material inherently is brittle and tends to break if not designed and handled properly. Because of structural integrity considerations, the ribs, particularly at the trailing edge, contain certain constraints which are not necessarily advantages from a cooling aspect. Hence, for example, the flow cavities that serve to cool the trailing edge are typically an array of closely spaced flow channels defined by the ribs and serve to meter cooling flow to obtain optimized cooling effectiveness. Because of these constraints, these flow channels cannot be made sufficiently narrow and shallow to satisfy this requirement. The ceramic cores either become too fragile to handle or cannot survive the casting process. Notwithstanding the above deficiencies, it is also desirable to provide for the cooling effectiveness means by which the cooling flow rate can be adjusted.

The problems attributed to in the above description are exemplified, for example, in U.S. Pat. Nos. 4,515,523 granted to W. E. North, et al on May 7, 1985 and 4,526,512 granted to R. B. Hook on Jul. 2, 1985 which are also incorporated herein for reference.

The U.S. Pat. No. 4,515,523 discloses the use of ribs for structural support of the trailing edge and pin fins and protuberances extending from the ribs for heat transfer enhancement. The U.S. Pat. No. 4,526,512 discloses a spool for a flow control body disposed at the trailing edge of the airfoil of a stator vane for controlling the flow exiting the trailing edge flow channels.

Obviously, the impediment to flow created by the heat transfer enhancing mechanism and the structural ribs to some extent control the flow through the trailing edge. Due to the nature of convective cooling, the slots and the opening between the pins, pedestals and the like are small and the tolerances occasioned in castings of this type produce large variations in these openings and hence the flow at different locations along the trailing edge vary considerably. This, of course, is a problem that needs to be corrected in order to attain maximum life out of the member being cooled as well as conserving cooling air, which impacts engine performance. Typically, in heretofore methods of fabricating the blade, the blade is flow tested in a well known manner, and pursuant to the results of the flow tests, the die for making the ceramic core is modified with the aim of modifying the core and correcting the flow or pressure deficiencies. This is an expensive and time-consuming process, and whenever time is allowed in a given development program, this procedure can be repeated, obviously compounding the expenses and time problems.

We have found that we can obviate the problems outlined in the preceding paragraphs and provide a means and method for controlling the rate of flow of the cooling air in the trailing edge. To this end, we provide restrictions either in proximity to the structured ribs or in the ribs themselves that serve to meter the flow in the trailing edge slots or flow channels. The method of tuning in or tailoring the flow is by incorporating into the ceramic core the openings that will define these restrictions and undersizing these openings. After the blade is cast, the core is leached out. The blade is then flow tested to establish a datum from which the restrictor size required for proper flow and pressure is ascertained. Obtaining the restrictor size becomes very simple and routine merely by enlarging the openings in the core, which have been intentionally undersized, to the desired dimension. Hence, the core is modified to the new dimensions without having to adjust the core dies. The sizing can be done in the cleaning process of the core when the flashing is removed.

SUMMARY OF INVENTION

An object of this invention is to tune the cooling air flow rate of the trailing edge of the airfoil in a gas turbine engine by sizing the core used in fabricating the airfoil.

A feature of this invention is to include restrictors in combination with the trailing edge ribs to meter the flow in the trailing edge channels.

Another object of this invention is to include the method of tuning cooling air flow rate out of the trailing edge slots by making a ceramic core including undersized openings intended to be used as metering means, casting a blade with the core, leaching out the core, flow testing the blade to ascertain the flow and pressure through each of the trailing edge slots and enlarging the openings to provide metering means that attain the desired flow and pressure.

The foregoing and other features and advantages of the present invention will become more apparent from the following description and accompanying drawing.

BEST MODE FOR CARRYING OUT THE INVENTION

Figure 1:
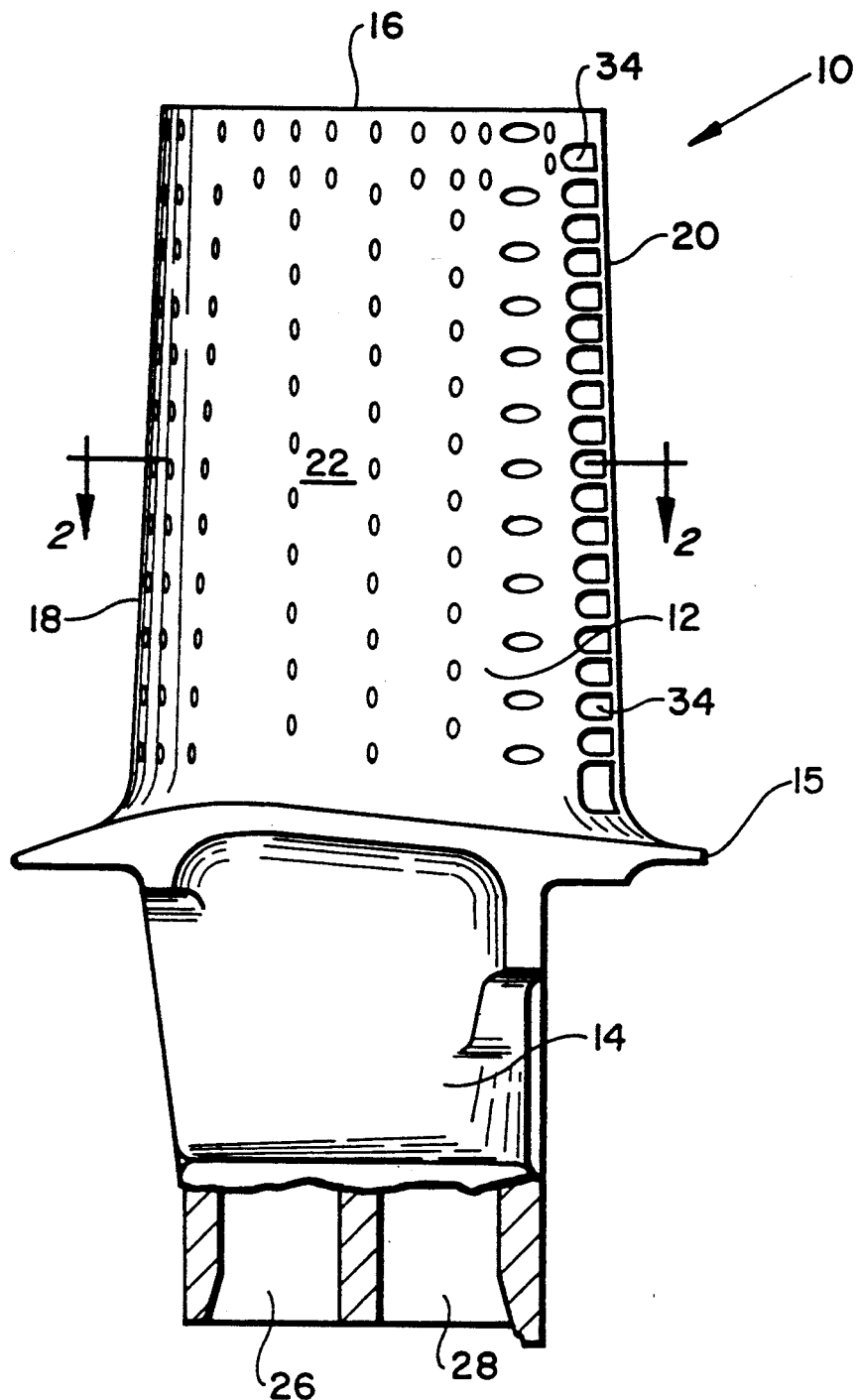
FIG. 1 is a view in elevation and partly in section illustrating a gas turbine engine turbine blade.

Reference is now made to FIG. 1 which is a typical representation of an axial flow turbine blade generally illustrated by reference numeral 10 comprising an airfoil section 12 and root section 14 separated by the platform 15. The blade is mounted in a disk which in turn is rotatably supported to the main engine shaft which is connected to the compressor of the gas turbine engine (not shown). A portion of the energy is extracted from the engine working fluid that impinges on the blade for powering the compressor and a portion is used in developing thrust for powering the aircraft. Obviously, since the turbine sees engine working fluid at or nearly at its highest temperature, the metal parts in this location of the engine require cooling by sophisticated cooling techniques.

Figure 2:
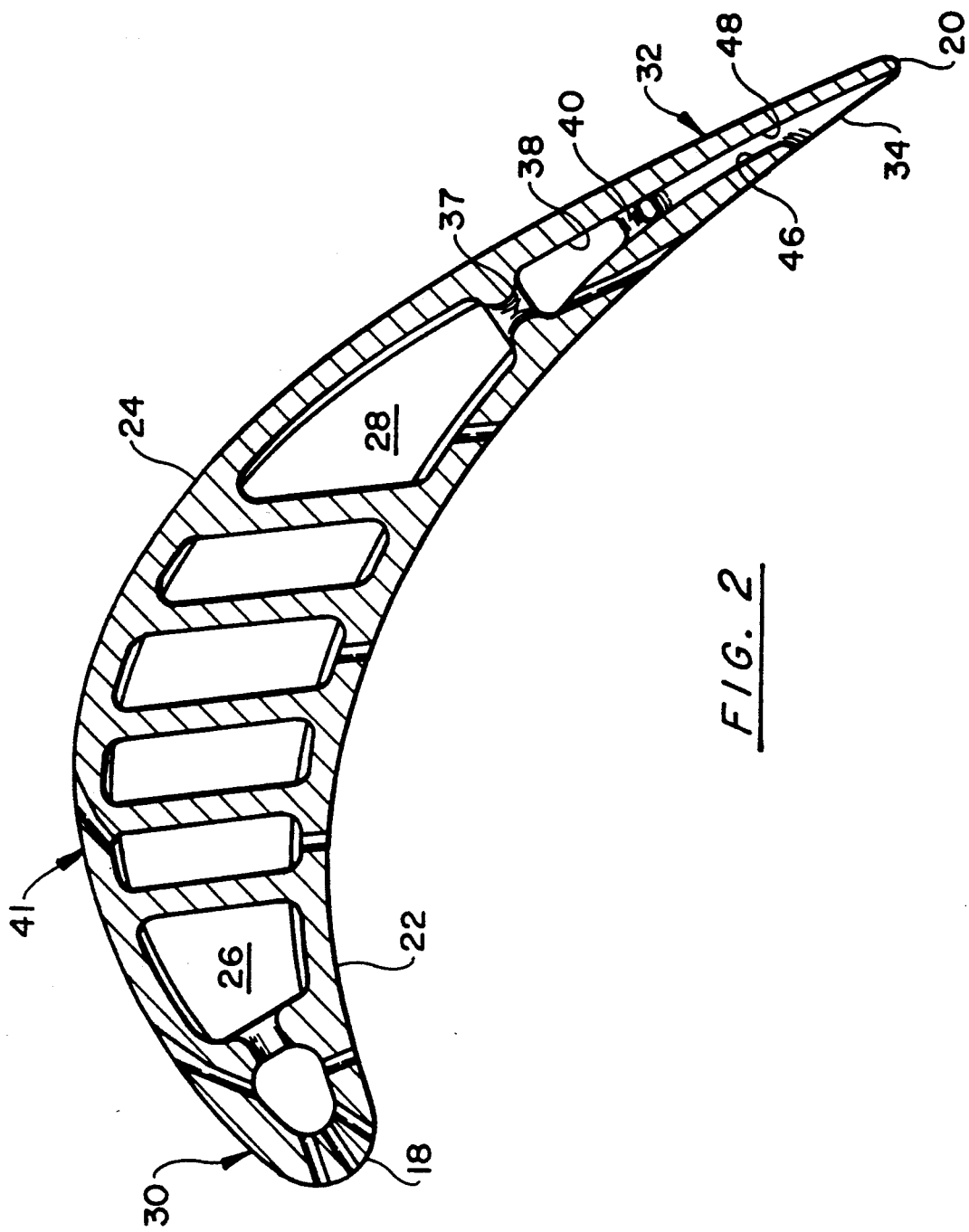
FIG. 2 is a sectional view taken along lines 2—2 of FIG. 1.

As viewed in FIGS. 1 and 2, the airfoil 12 comprises a tip 16, leading edge 18, trailing edge 20, pressure surface 22, and suction surface 24. Cooling air typically bled from one of the several stages of the compressor (not shown) feeds two entry passages 26 and 28, which in turn feed cooling air to the leading edge portion 30, trailing edge portion 32, and the mid portion 41 which carries a series of serpentine passageways. What has been described is well known in the art, and since this invention pertains only to the trailing edge, for the sake of simplicity and convenience only the trailing edge portion will be described.

Figure 3:
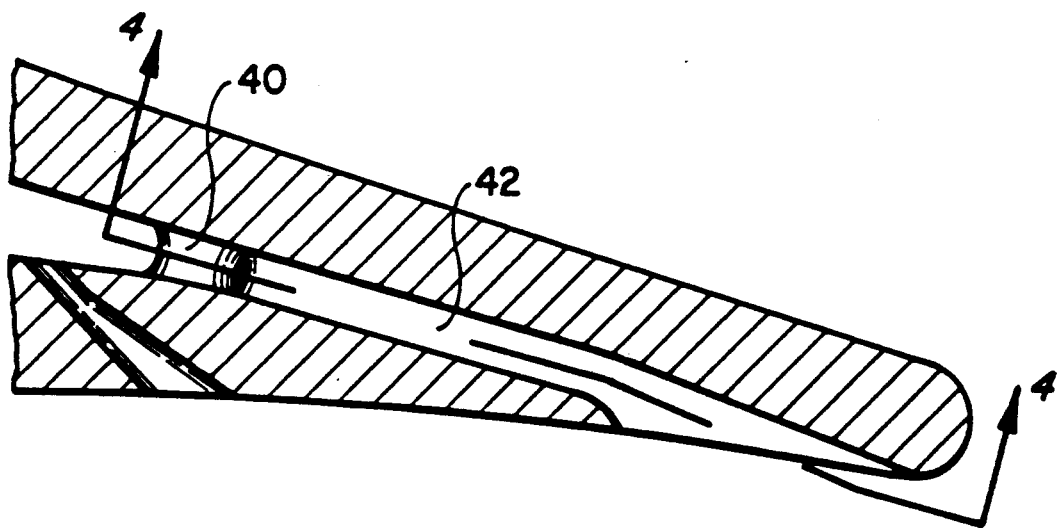
FIG. 3 is an enlargement of the trailing edge portion of FIG. 2.
Figure 4:
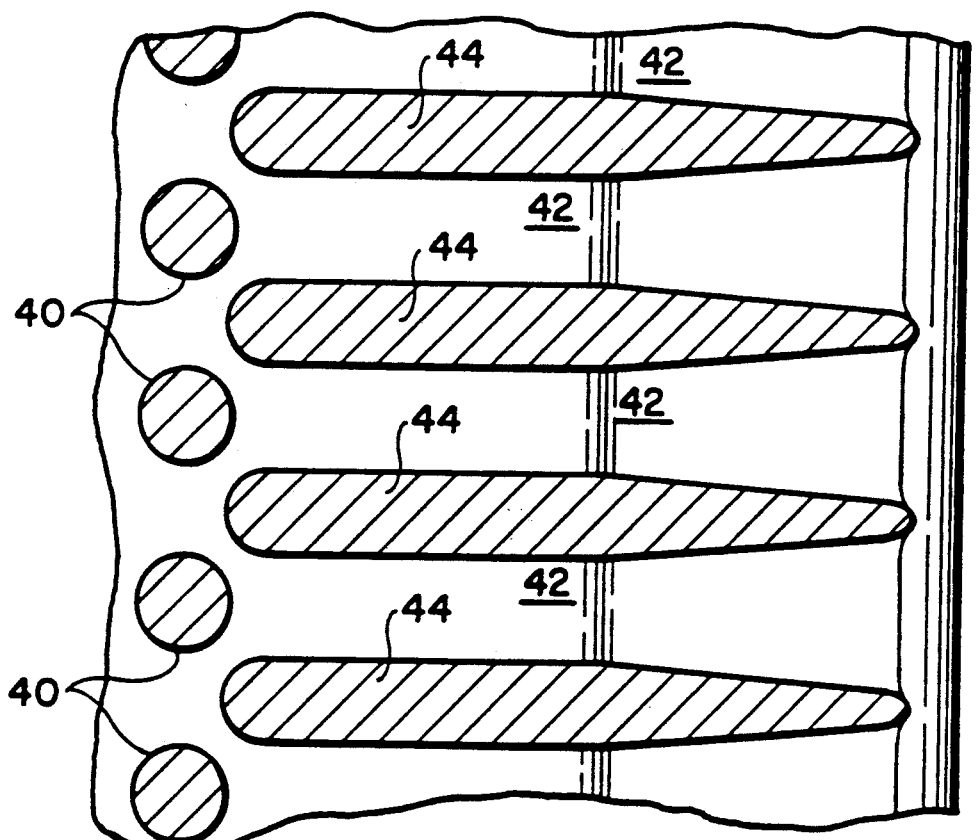
FIG. 4 is a partial view in section taken along lines 4—4 of FIG. 3.

As is apparent from FIGS. 2-4, cooling air from passageway 28 flows out of the trailing edge slots 34 by first flowing through apertures 37, cavity 38, past flow restrictions 40, and channels 42 defined between the axially extending ribs 44 which connects to the walls 46 and 48 of the pressure side and suction side of the blade. According to this invention, flow restrictions 40 are located in proximity to the leading edge of the adjacent rib 44 and serve to meter cooling flow into the channels 42. Obviously, the space between restrictor 40 and rib 44 determine the flow area and by positioning the two relative to each other can be an effective way in which the rate of flow can be controlled.

Figure 6:
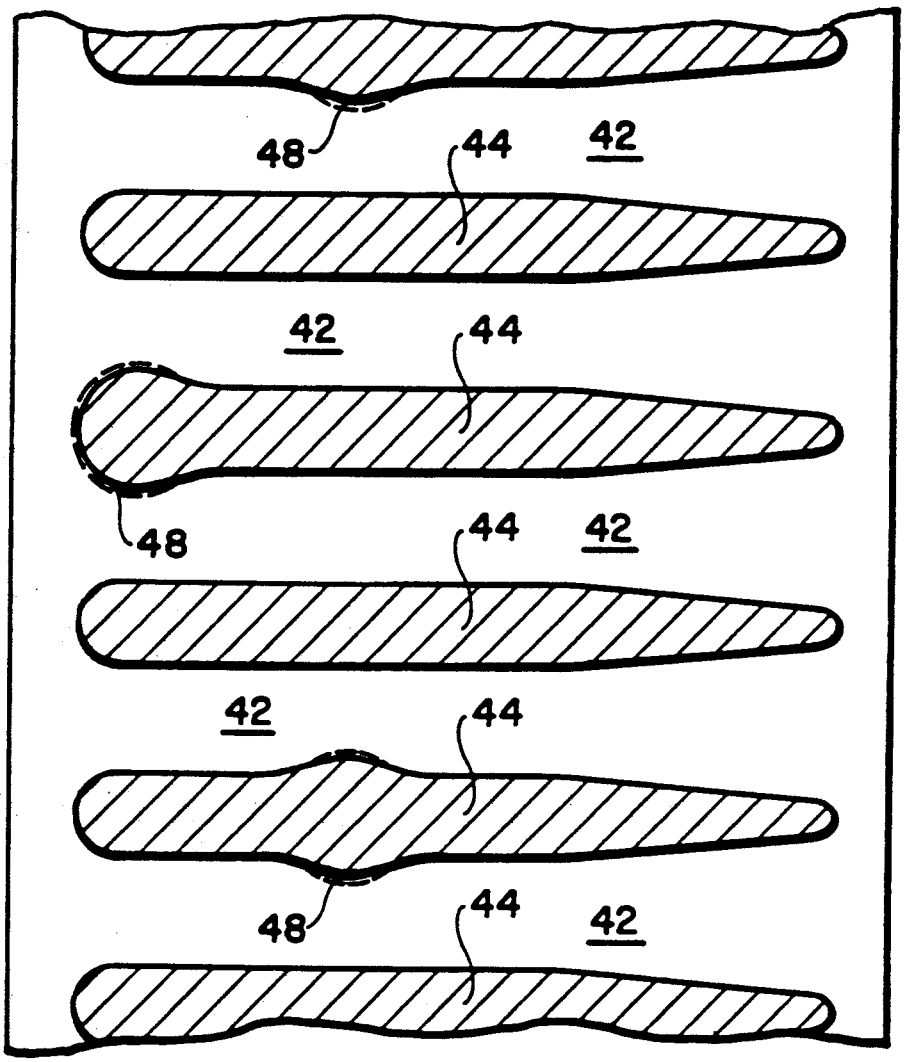
FIG. 6 is a partial view of the trailing edge of a turbine blade exemplifying another embodiment of this invention.

FIG. 6 is another embodiment in which the restrictions were made integral with the ribs and likewise can be used to meter the flow. As noted, the restrictor 48 projects from rib 44 into channel 42 and serves to restrict flow in the channel. (Like reference numerals refer to like elements in all the FIGS.) It is obvious that the diameter of restrictor 48, like the diameter of restrictor 40 (FIG. 4) will determine the flow area of the metering portion of channels 42. Restrictors 48 are located on alternate ribs since one restrictor controls the flow in two adjacent channels. Each restrictor may be located at various locations on each rib depending on the structural, flow and pressure characteristics of each application.

Figure 5:
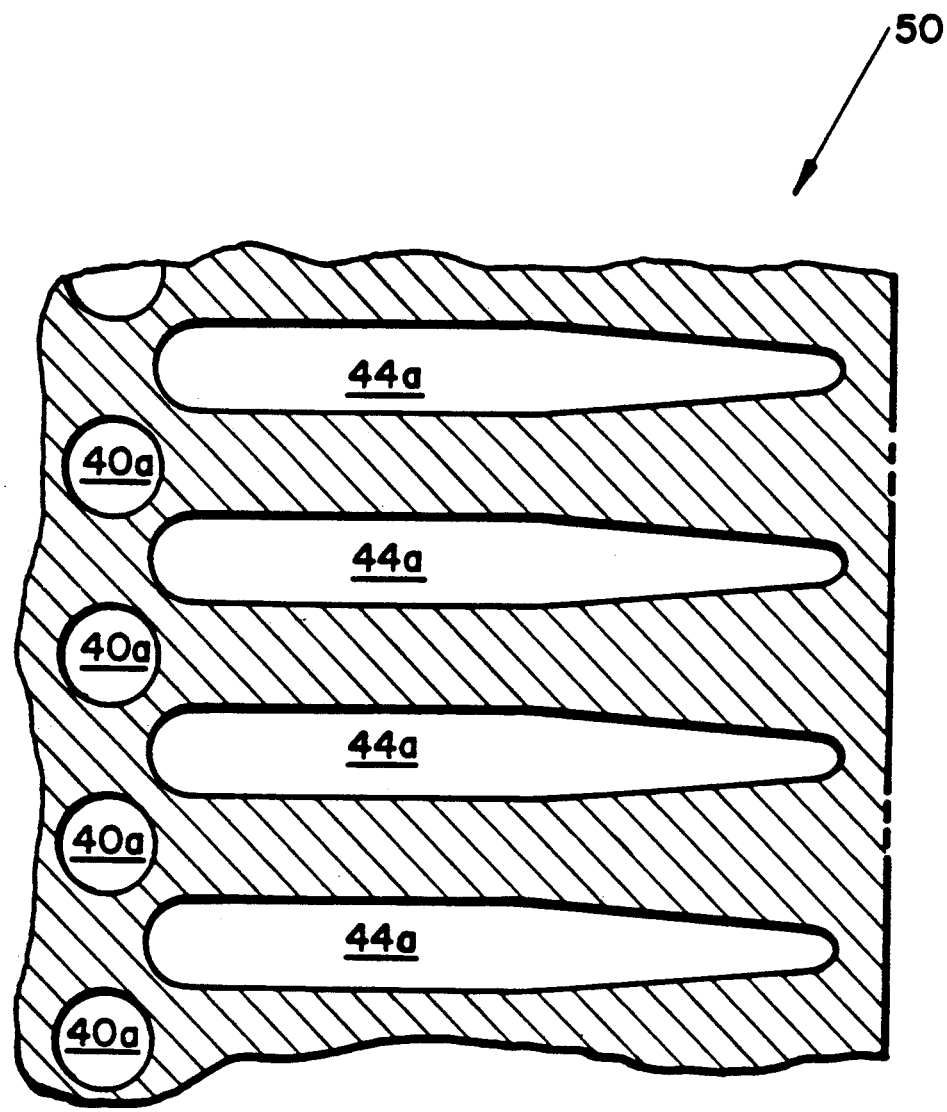
FIG. 5 is a view in section of the ceramic core from which the portion of the blade depicted in the drawing of FIG. 4 was made.
Figure 7:
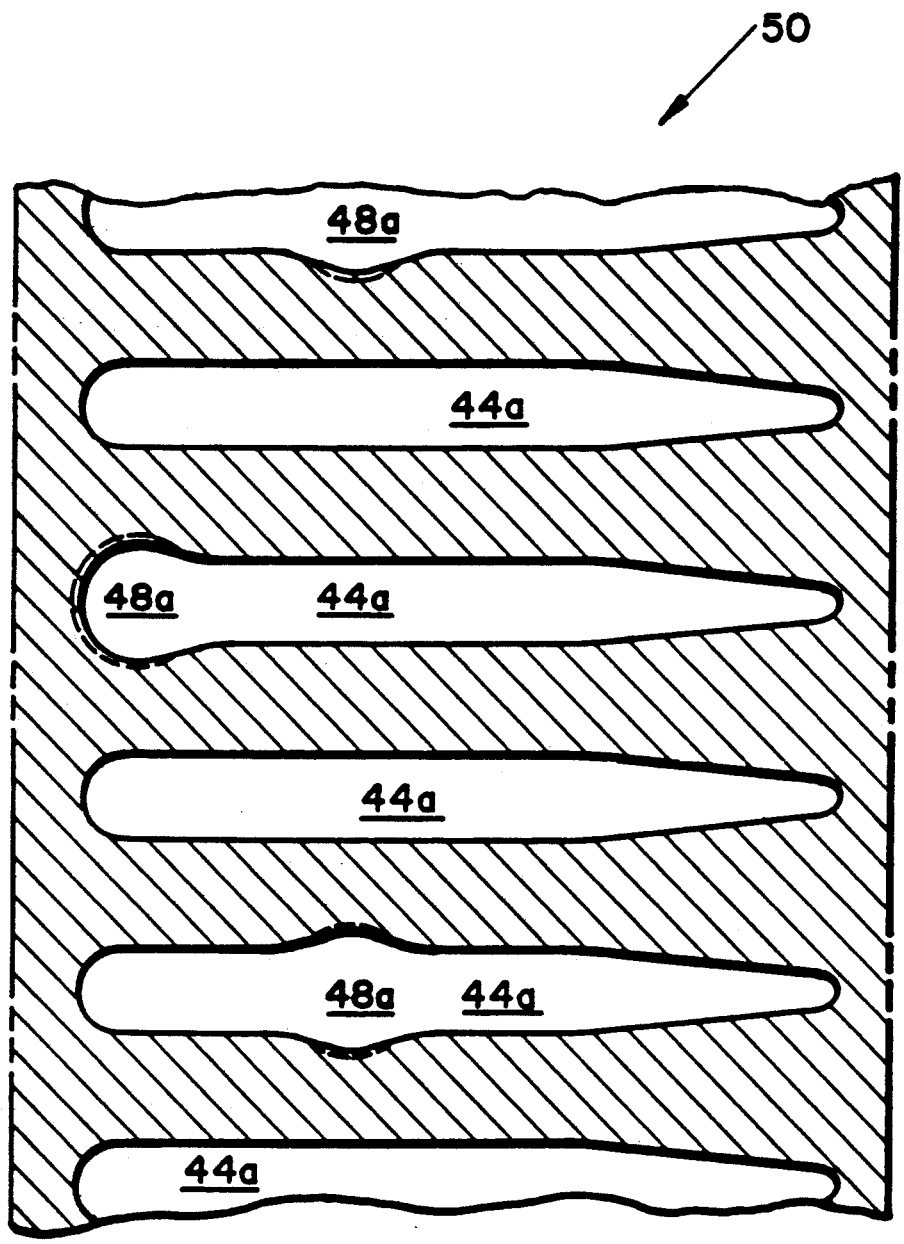
FIG. 7 is a partial view in section of the ceramic core from which the portion of the blade depicted in FIG. 6 was made.

The next portion of this description relates to the method of tuning or tailoring the flow rate in the trailing edge channel. As mentioned above, this is a simple procedure executed in the investment casting process. As the particular process is well known, for the sake of simplicity and convenience the details of the process are omitted from this disclosure. Suffice it to say that the internal details of the blade are cast by using a ceramic core generally illustrated by reference numeral 50 in FIGS. 5 and 7 that is made by a die set. Obviously, when molten metal is poured in the mold, it will occupy the voids in the mold formed after the was is removed.

It is apparent from viewing FIGS. 4-7 restrictors 40 and 48 in the blade appear as circular apertures or voids 40a and 48a in the core.

The method of tuning in the flow rate contemplates undersizing the restrictors by dimensioning the diameters of the apertures 40a and 48a to a smaller size. After a blade is cast, the blade is then flow tested to determine the flow rates in each of the channels. Any deviation to flow rates and/or pressure can be corrected simply by increasing the diameter of each of the apertures 40a and 48a which in the next cast part will enlarge the restrictors 40 and 48.

Obviously, since the flashing is cleaned after the ceramic core is formed with the die, it is a relatively simple task to drill or ream larger apertures in the core to correct the undersized dimension. Of course, in certain circumstances the die can be changed to reflect the new dimensions of the restrictors.

Although this invention has been shown and described with respect to detailed embodiments thereof, it will be understood by those skilled in the art that various changes in form and detail thereof may be made without departing from the spirit and scope of the claimed invention.

We claim:
1. The method of manufacturing and casting a turbine blade having internal passages for leading cooling air internally through the blade and discharging the spent cooling air through the trailing edge of the blade at a predetermined flow rate and manner comprising the steps of:
 1) preforming a core from a ceramic material by a preshaped die which shape includes a plurality of radially spaced axial slots extending to the trailing edge to form ribs in the trailing edge when the blade is cast and a plurality of circular shaped radially spaced holes in proximity to the leading edge of each of said plurality of spaced axial slots to form projections when the blade is cast, the circular shaped holes being dimensioned to have a diameter smaller than is required to produce said projections in the cast blade that flows more than a predetermined amount of cooling air through each of said slots in the trailing edge of the turbine blade than is desired,
 2) cleaning the core and removing from the core the flashing that forms on the core in the step of preforming the core,
 3) casting the turbine blade utilizing a preshaped mold including the core,
 4) leaching the core from the turbine blade,
 5) flow testing the cast turbine blade by flowing air through the internal passages in the blade and recording the flow rates and pressures in each of said slots, and
 6) repeating the steps 1-5 inclusive but enlarging the circular holes in the ceramic core by drilling or reaming in the step of cleaning and continue repeating the steps 1-5 inclusive until the desired predetermined flow rate is reached.

2. The method of manufacturing as defined in claim 1 and locating the circular shaped, radially spaced holes in the ceramic core between adjacent radially spaced projections.

3. The method of manufacturing as defined in claim 1 including the further step of reshaping the preshaped die to conform with the dimension of the circular hole in the ceramic core after the step of flow testing indicates said predetermined flow rate is attained.

4. The method of manufacturing as defined in claim 1 wherein said projections in the cast turbine blade are formed integral with said ribs.

5. The method of manufacturing as defined in claim 4 wherein said projections in the cast turbine blade are included on alternate radially spaced projections.

6. The method of manufacturing as defined in claim 5 wherein said projections are located at different radial locations on said ribs.

7. The method of manufacturing as defined in claim 6 wherein at least one of the integral circular projections is at the leading edge of said axial projection.

* * * * *

UNITED STATES PATENT AND TRADEMARK OFFICE
CERTIFICATE OF CORRECTION

PATENT NO.  : 5,243,759

DATED       : September 14, 1993

INVENTOR(S) : WESLEY D. BROWN, ET AL

It is certified that error appears in the above-identified patent and that said Letters Patent is hereby corrected as shown below:

Col. 1, before "TECHNICAL FIELD", insert --Claims 1-3 (inclusive) of this invention were made under a Government contract and the Government has rights to the invention covered by these claims 1-3.--

Signed and Sealed this

Seventh Day of June, 1994

Attest:

BRUCE LEHMAN

Attesting Officer

Commissioner of Patents and Trademarks